(12) United States Patent
Farris

(10) Patent No.: US 9,686,285 B2
(45) Date of Patent: Jun. 20, 2017

(54) SECURELY TRANSMITTING AUTHENTICATION INFORMATION

(71) Applicant: Verizon Patent and Licensing Inc., Basking Ridge, NJ (US)

(72) Inventor: Jack M. Farris, Mendham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 615 days.

(21) Appl. No.: 14/222,881

(22) Filed: Mar. 24, 2014

(65) Prior Publication Data

US 2015/0271136 A1  Sep. 24, 2015

(51) Int. Cl.
*H04W 12/06* (2009.01)
*H04L 29/06* (2006.01)

(52) U.S. Cl.
CPC .......... *H04L 63/10* (2013.01); *H04L 63/0853* (2013.01); *H04L 63/18* (2013.01); *H04W 12/06* (2013.01)

(58) Field of Classification Search
CPC ..... H04W 12/06; H04L 9/0813; H04L 9/0844
See application file for complete search history.

(56) References Cited

U.S. PATENT DOCUMENTS

2004/0243517 A1\* 12/2004 Hansen .................. G06Q 20/00
705/64
2013/0340028 A1\* 12/2013 Rajagopal ............... H04L 63/08
726/1

\* cited by examiner

*Primary Examiner* — Arvin Eskandarnia

(57) ABSTRACT

A device receives a request from a terminal device to start a session to authenticate a person associated with an account. The device creates the session. The session is associated with the terminal device. The device receives session information and authentication information from a user device operated by the person. The device determines the session based on the session information and generates an authentication message based on the authentication information. The device transmits the authentication message to the terminal device associated with the session to authenticate that the person is associated with the account.

20 Claims, 8 Drawing Sheets

FIG. 6
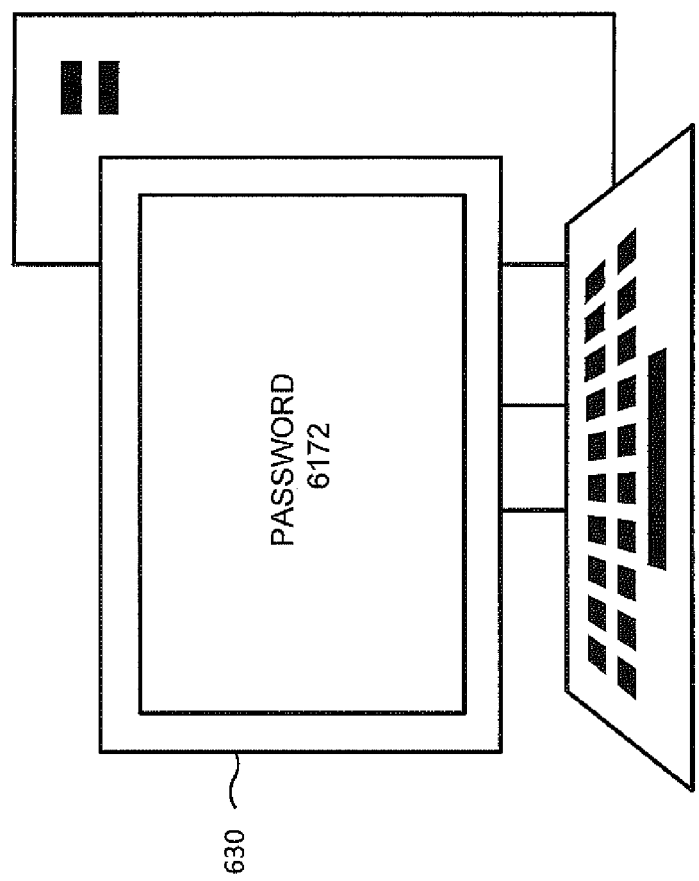
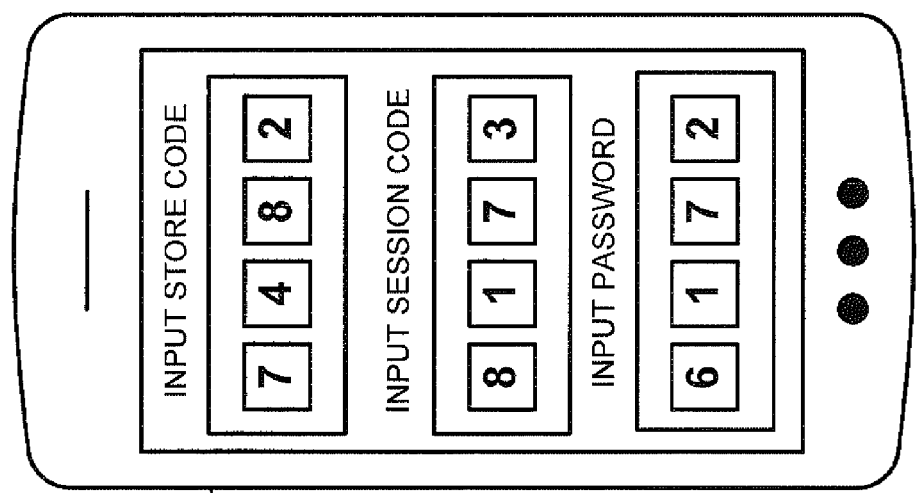

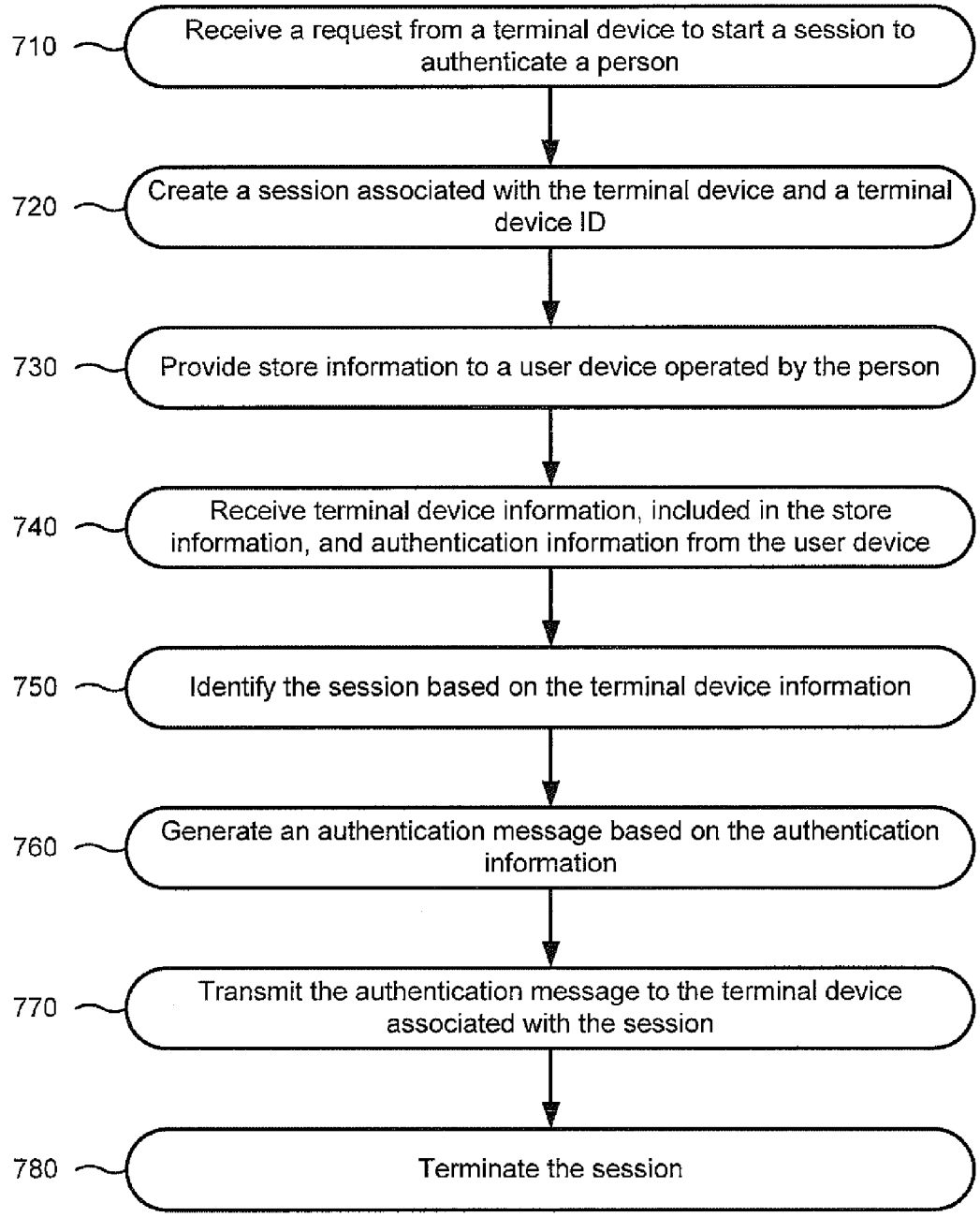

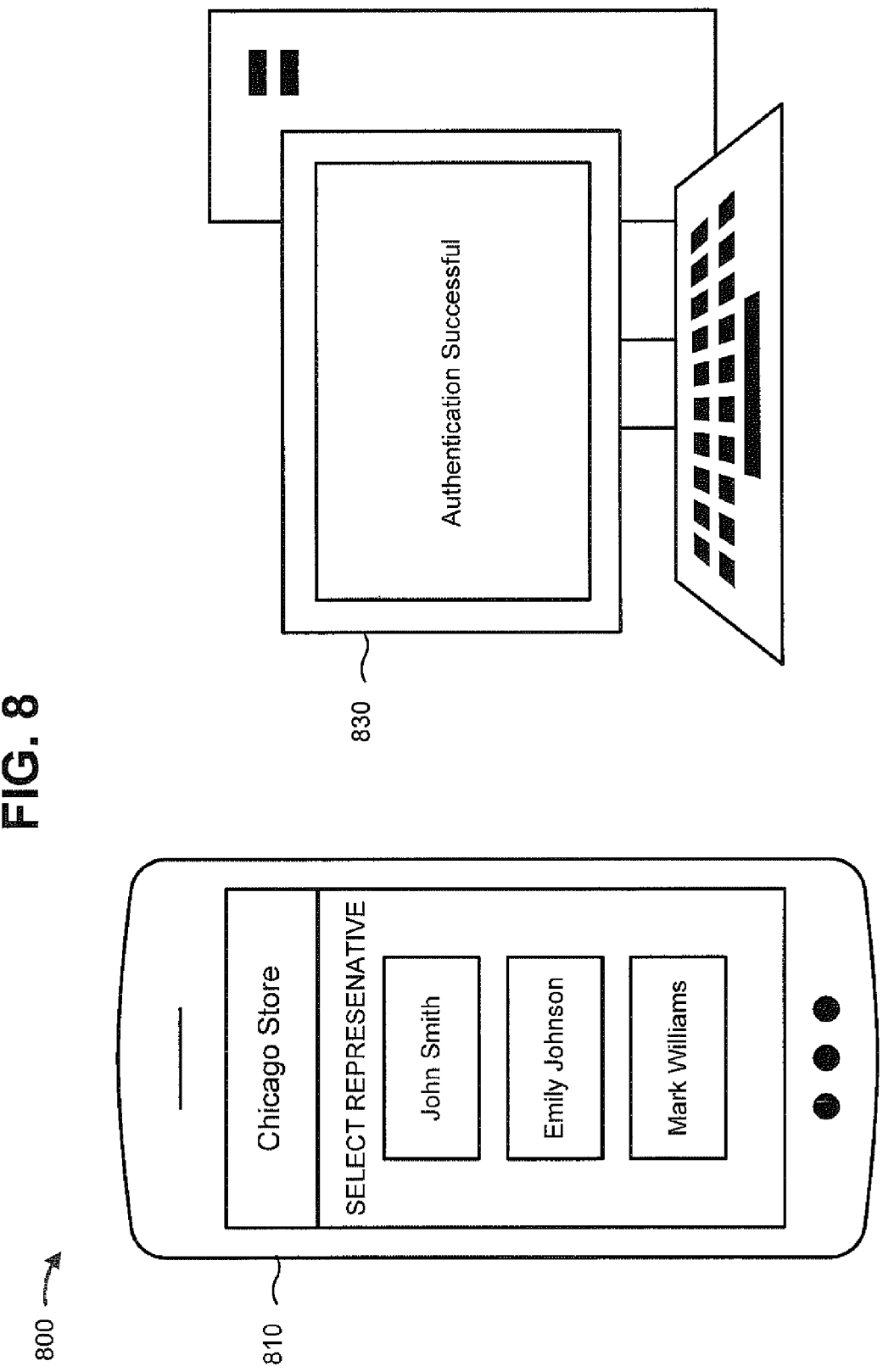

SECURELY TRANSMITTING AUTHENTICATION INFORMATION

BACKGROUND

A person may have an account with a store or a business. For example, a person may have a mobile phone account with a mobile phone service provider or a bank account with a bank. The person may desire to go into a store and discuss the account with a store representative (e.g., a store employee). However, to access the account, the person may be required to verbally give authentication information (e.g., an account password) to the store representative in the presence of other customers at the store. Accordingly, another customer may overhear the person's password causing security or privacy issues.

BRIEF DESCRIPTION OF THE DRAWINGS

FIG. 6 is a diagram of an example implementation relating to the process shown in FIG. 5;

FIG. 7 is a flowchart of an example process for transmitting an authentication message from a user device to a terminal device; and FIG. 8 is a diagram of an example implementation relating to the process shown in FIG. 7.

DETAILED DESCRIPTION OF PREFERRED EMBODIMENTS

The following detailed description of example implementations refers to the accompanying drawings. The same reference numbers in different drawings may identify the same or similar elements.

A person verbally giving account information to a store representative may create privacy or security concerns. For example, other people in the store may overhear the password. Implementations described herein may improve privacy and/or security by allowing a person at a store to verify the person is an authorized user of an account using a person's mobile device to transmit authentication information to the store representative in a manner that may not be intercepted by other customers.

Figure 1:
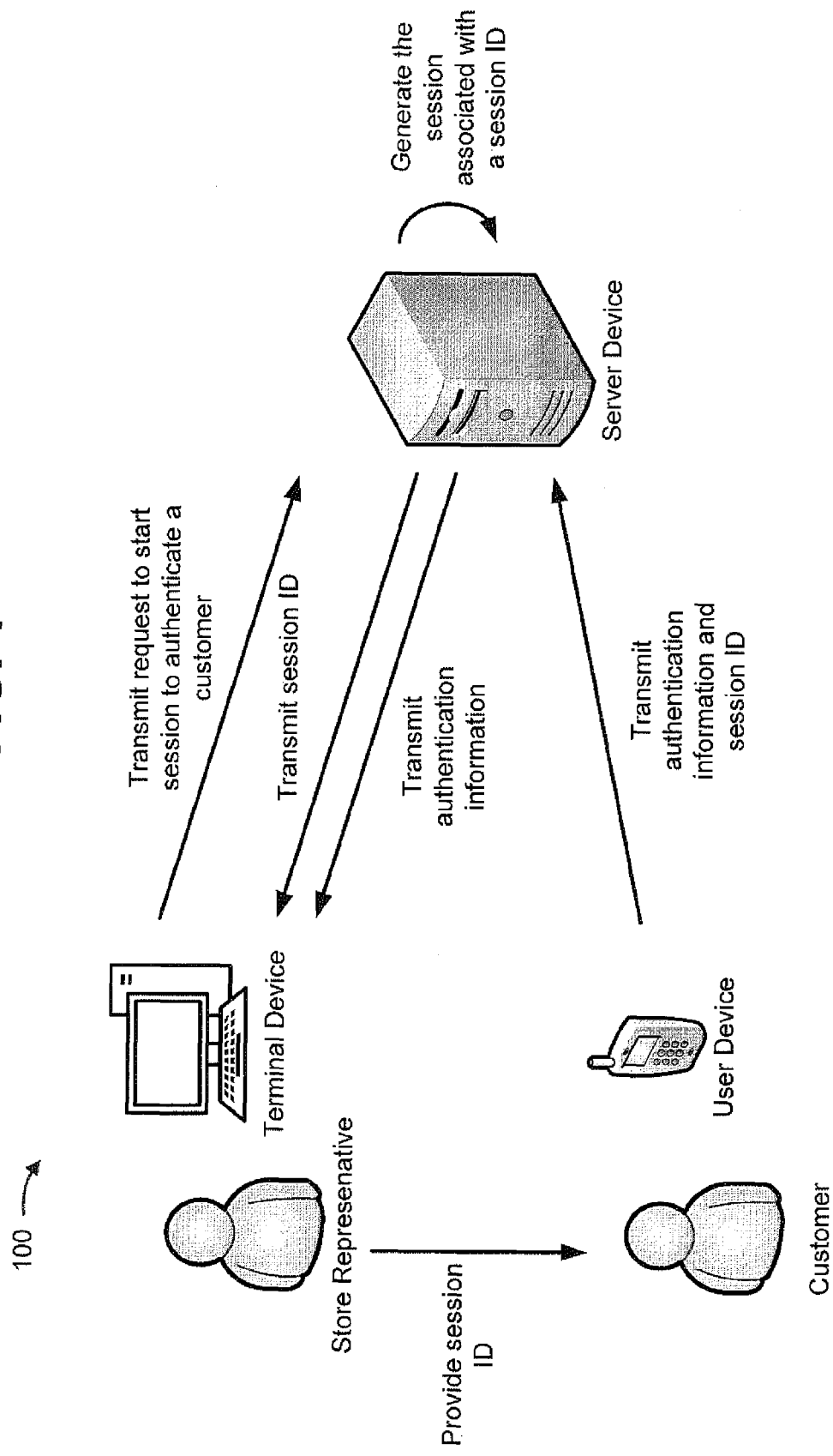
FIG. 1 is a diagram of an overview of an example implementation described herein.

FIG. 1 is a diagram of an overview of an example implementation 100 described herein. Assume a customer enters a store and requests to speak with a store representative about an account. The customer may provide an account identifier to the store representative identifying the account.

The store representative may use a terminal device at the store to transmit a request to a server device to start a session used to authenticate that the customer is authorized to access the account. The server device may receive the request and may create the session, and associate the session with a session identification (ID). The server device may transmit the session ID to the terminal device.

The terminal device may receive the session ID and display the session ID. The store representative may provide the session ID to the customer. For example, the store representative may verbally tell the customer the session ID or allow the customer to read the session ID displayed by the terminal device.

The customer may input the session ID and authentication information (e.g., a password) into a user device. The user device may transmit the session ID and the authentication information to the server. Additionally, or alternatively, the user device may store the authentication information preprogrammed to be provided with the session ID when triggered by the customer.

The server device may receive the session ID and the authentication information from the user device. The server device may transmit the authentication information to the terminal device based on the session ID. The terminal device may receive the authentication information and determine whether the customer is authorized to discuss the account.

In this way, a person may provide a store representative with authentication information for an account without other customers in the store overhearing or intercepting the authentication information.

Figure 2:
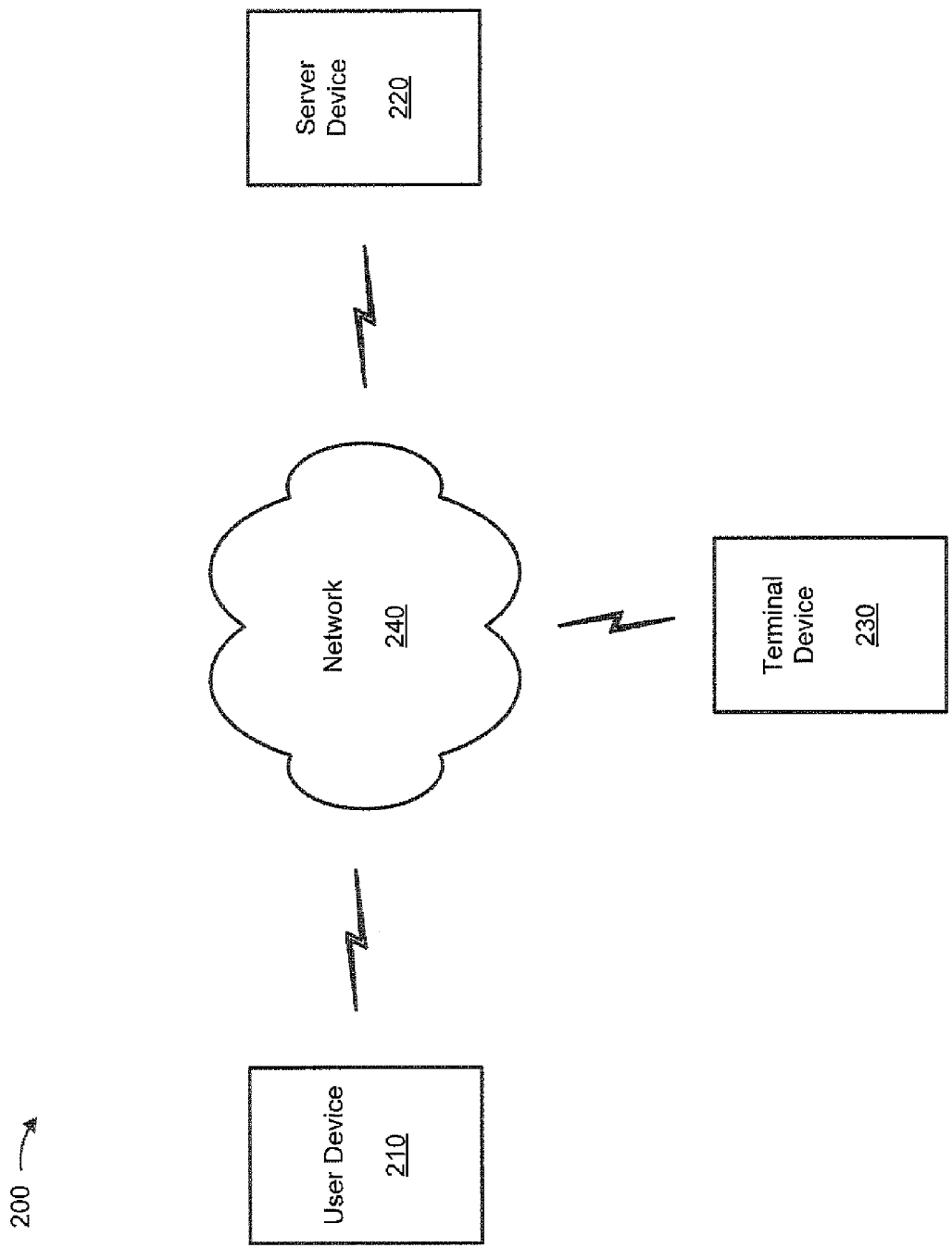
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, a terminal device 230, and/or a network 240.

User device 210 may include a device capable of receiving, processing, and providing information. For example, user device 210 may include a mobile phone (e.g., a smart phone, a radiotelephone, etc.), a computing device (e.g., a laptop computer, a tablet computer, a handheld computer, etc.), or a similar device. In some implementations, user device 210 may include a communication interface that allows user device 210 to receive information from and/or transmit information to server device 220 and/or another device in environment 200. User device 210 may store and execute an application for authenticating a user.

Server device 220 may include one or more devices capable of processing and/or routing information. In some implementations, server device 220 may include a communication interface that allows server device 220 to receive information from and/or transmit information to other devices in environment 200.

Terminal device 230 may include a device capable of receiving, processing, and providing information. For example, terminal device 230 may include a mobile phone (e.g., a smart phone, a radiotelephone, etc.), a computing device (e.g., a desktop computer, a laptop computer, a tablet computer, a handheld computer, etc.), or a similar device. In some implementations, terminal device 230 may include a communication interface that allows terminal device 230 to receive information from and/or transmit information to other devices in environment 200. Terminal device 230 may be located at a store. The store may be any place of business (e.g., a bank, a phone company store, a cable company store, a clothing store, a department store, an office, etc.).

Network 240 may include one or more wired and/or wireless networks. For example, network 240 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 270 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
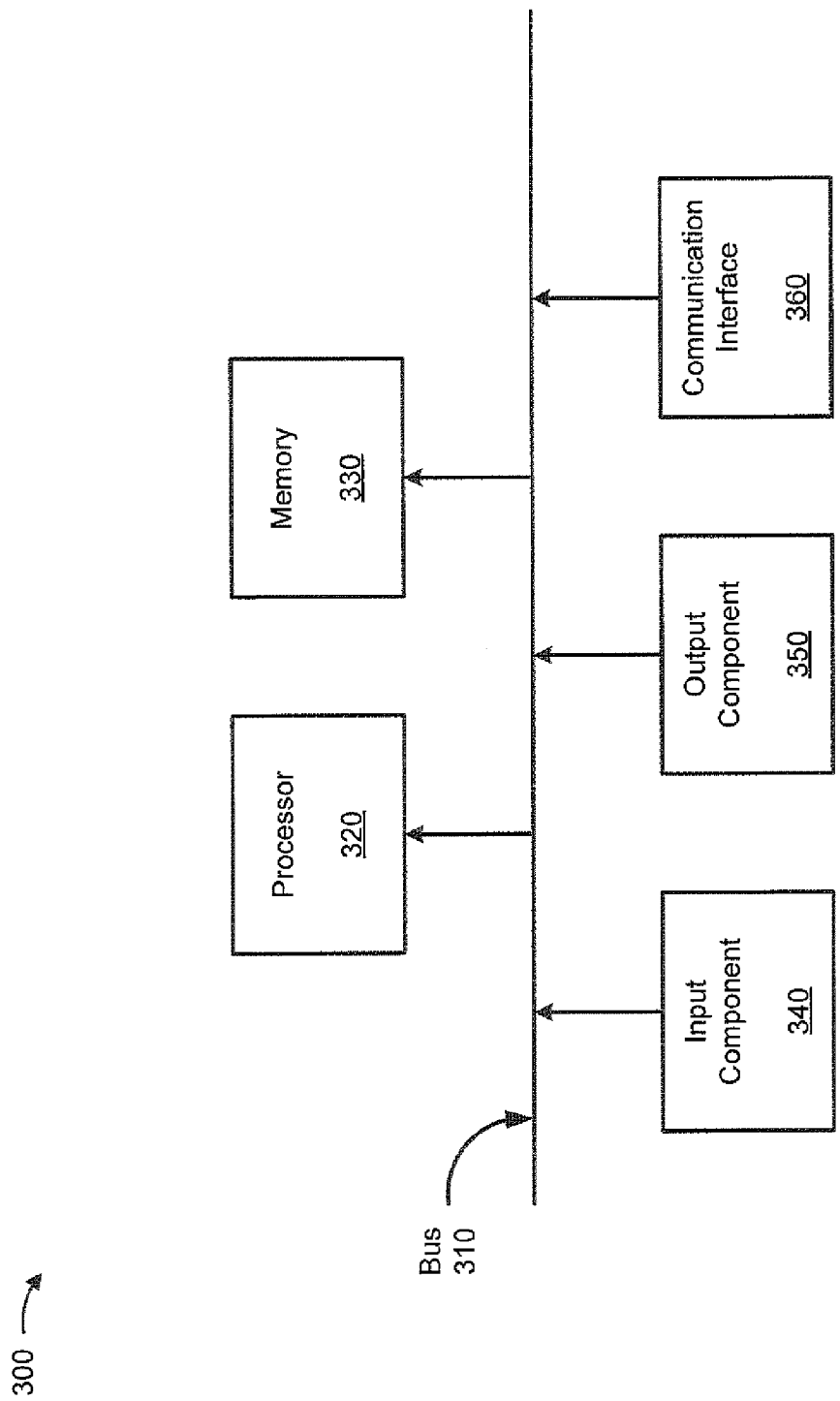
FIG. 3 is a diagram of example components of a device that corresponds to one or more devices of FIG. 2.

FIG. 3 is a diagram of example components of a device 300 that corresponds to one or more devices of FIG. 2. Device 300 may correspond to user device 210, server device 220, and/or terminal device 230. Additionally, or alternatively, user device 210, server device 220, and/or terminal device 230 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Input component 340 may also include a sensor for sensing information. For example, input component 340 may include a global positioning system (GPS) device for sensing a location of device 300.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
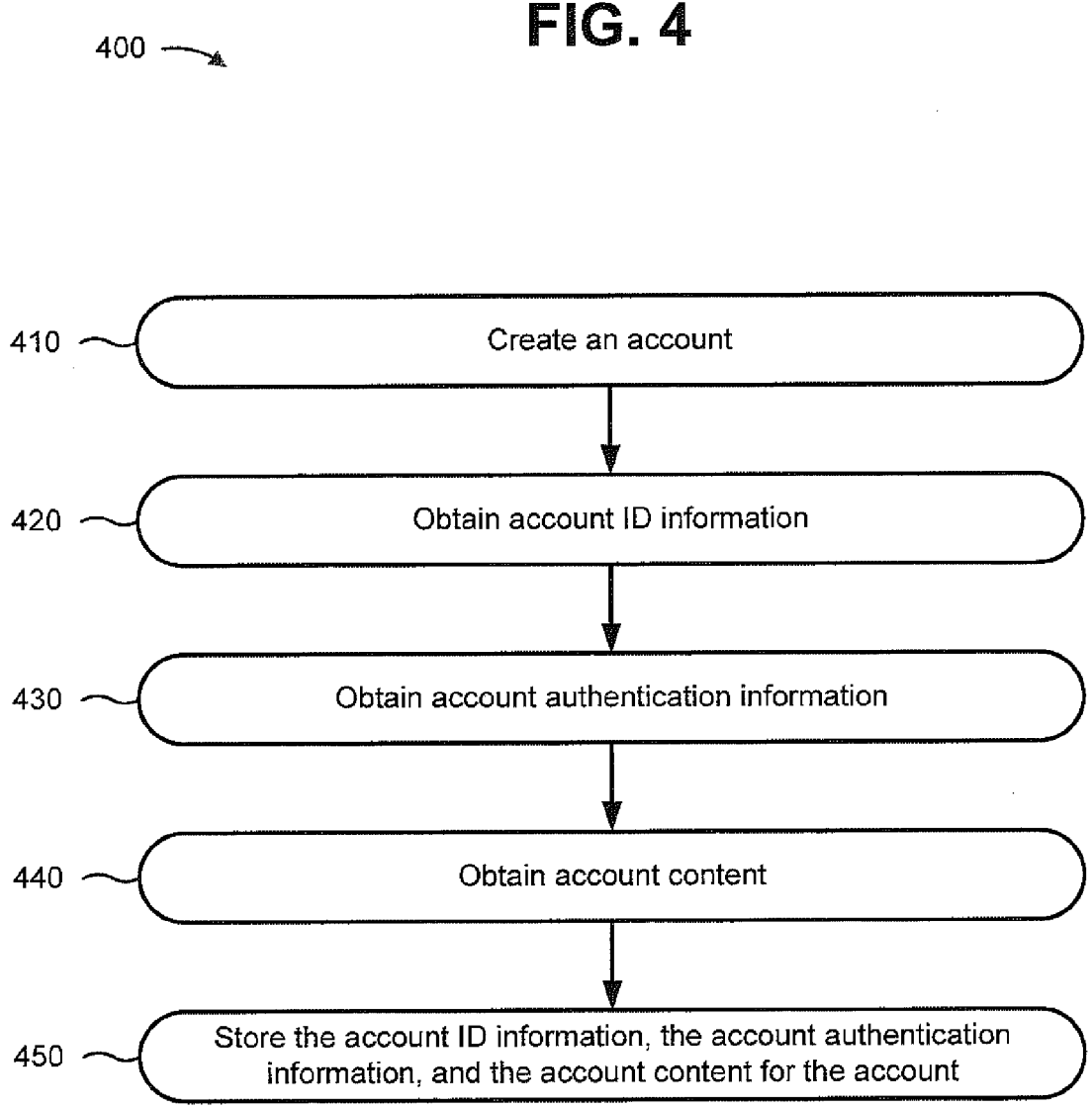
FIG. 4 is a flowchart of an example process for creating an account.

FIG. 4 is a flowchart of an example process 400 for creating an account. In some implementations, one or more process blocks of FIG. 4 may be performed by server device 220. Additionally, or alternatively, one or more process blocks of FIG. 4 may be performed by another device or a group of devices separate from or including server device 220.

As shown in FIG. 4, process 400 may include creating an account (block 410). For example, server device 220 may create the account.

Server device 220 may create the account by generating an entry in an account data structure for the account. Server device 220 may store the entry in the account data structure stored in a memory of server device 220 and/or another device. Server device 220 may generate the account based on receiving a request from user device 210, terminal device 230, and/or another device.

As further shown in FIG. 4, process 400 may include obtaining account ID information (block 420). For example, server device 220 may obtain account ID information.

The account ID information may include an account identifier for the account (e.g., an account number, a mobile phone number for the account, etc.). Server device 220 may obtain the account identifier by generating the account identifier. The account identifier may include a string of characters of any length.

The account ID information may include contact information for a person authorized to use the account. For example, the account ID information may include an address, a phone number, an email address, or the like. A person may input the contact information into user device 210, terminal device 230, and/or another device, which may transmit the contact information to server device 220. Server device 220 may obtain the contact information by receiving the contact information from user device 210, terminal device 230, and/or another device.

As further shown in FIG. 4, process 400 may include obtaining account authentication information (block 430). For example, server device 220 may obtain the account authentication information.

The account authentication information may be information used to authenticate a person before accessing an account (e.g., a password). The account authentication information may be a string of characters of any length. A person may input the account authentication information into user device 210, terminal device 230, and/or another device, which may transmit the account authentication information to server device 220. Server device 220 may obtain the account authentication information by receiving the account authentication information from user device 210, terminal device 230, and/or another device.

As further shown in FIG. 4, process 400 may include obtaining account content (block 440). For example, server device 220 may obtain the account content.

The account content may be any information associated with a service provided by a store. For example, the account may be a bank account and the account content may include financial information. The account may be a phone account and the account content may include information about data usage. The account content may also include billing information and/or payment information for the account. Server device 220 may obtain the account content by receiving the account content form user device 210, terminal device 230, and/or another device. Additionally, or alternatively, server device 220 may obtain the account content by generating the account content.

As further shown in FIG. 4, process 400 may include storing the account ID information, the account authentication information, and the account content for the account (block 450). For example, server device 220 may store the account ID information, the authentication information, and the account content in the account data structure stored in a memory of server device 220 and/or another device.

While a series of blocks has been described with regard to FIG. 4, the blocks and/or the order of the blocks may be modified in some implementations. Additionally, or alternatively, non-dependent blocks may be performed in parallel.

Figure 5:
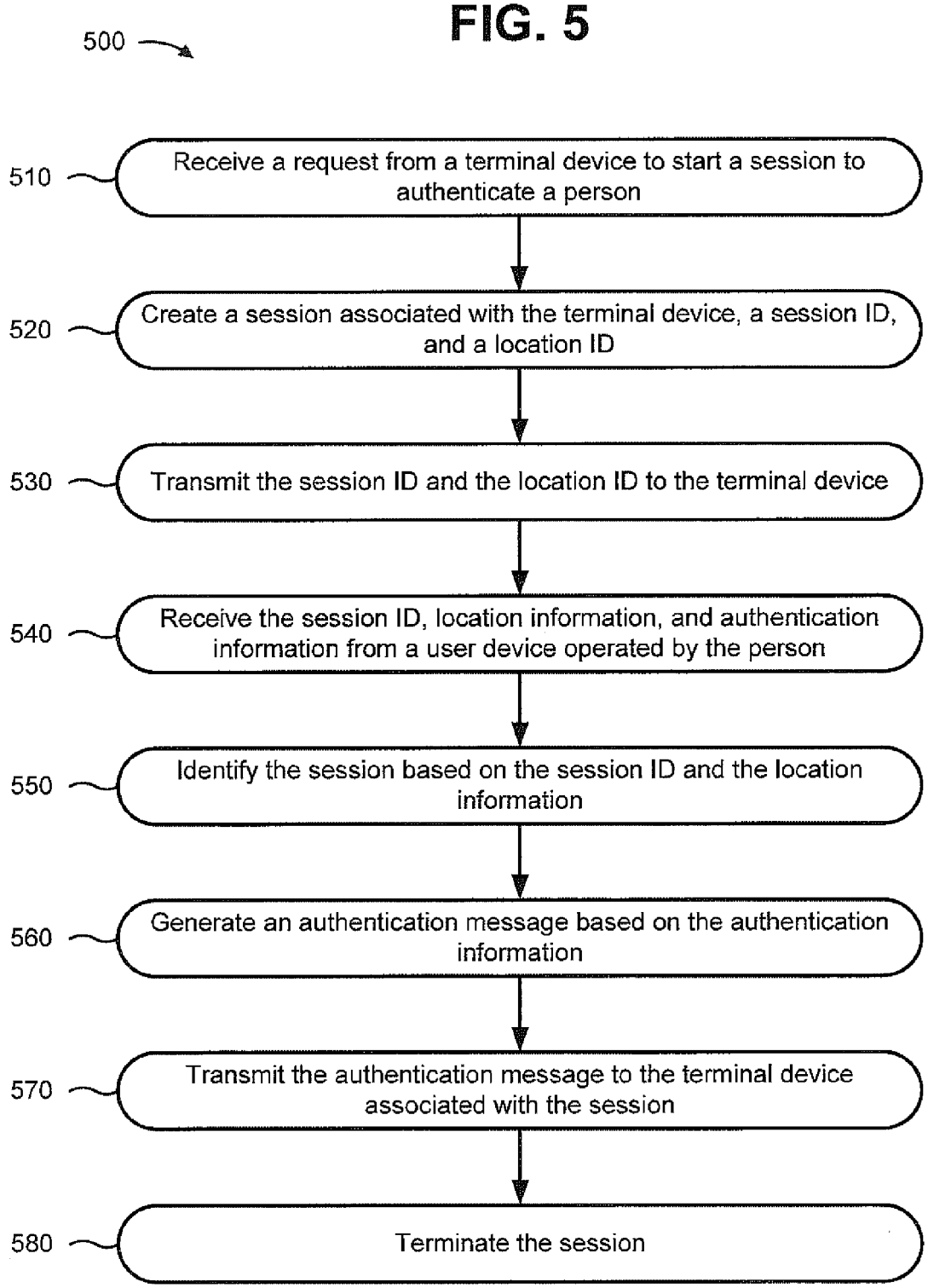
FIG. 5 is a flowchart of an example process for transmitting an authentication message from a user device to a terminal device.

FIG. 5 is a flowchart of an example process 500 for transmitting an authentication message from user device 210 to terminal device 230. In some implementations, one or more process blocks of FIG. 5 may be performed by server device 220. Additionally, or alternatively, one or more process blocks of FIG. 5 may be performed by another device or a group of devices separate from or including server device 220.

As shown in FIG. 5, process 500 may include receiving a request from terminal device 230 to start a session to authenticate a person (block 510). For example, server device 220 may receive the request from terminal device 230 to start a session.

A person may come into a store and desire to discuss or manage an account with a store representative. The store representative may ask the person to verbally provide account ID information identifying the account. The account ID information may be any information identifying the account. For example, the account ID information may be an account ID, contact information associated with the account (e.g., a phone number, an email address, a name, an address, etc.), a username associated with the account, or the like.

The store representative may have to verify that the person is authorized to access the account before discussing the account with the person. Accordingly, the store representative may use terminal device 230 at the store to transmit a request to server device 220 to start a session to authenticate the person at the store. The request may include information identifying terminal device 230 (e.g., an IP address for terminal device 230). Additionally, or alternatively, the request may include the account ID information identifying the account. Server device 220 may receive the request transmitted by terminal device 230.

As shown in FIG. 5, process 500 may include creating a session associated with terminal device 230, a session ID, and/or a location ID (block 520). For example, server device 220 may create the session.

Server device 220 may create the session by establishing an interactive information interchange between server device 220 and terminal device 230. Additionally, or alternatively, the session may be associated with an entry in a data structure identifying terminal device 230.

In some implementations, the session may be associated with a session ID identifying the session and a location ID identifying a location of terminal device 230.

The session ID may be a string of characters of any length. For example, the session ID may include numbers, letters, symbols, and/or other characters. In some implementations, the session ID may have a length that may be easily input by a user. For example, the session ID may have a length of five or fewer characters. The session ID may uniquely identify an active session (e.g., a session that has not been terminated) from among all stores. Additionally, or alternatively, the session ID may uniquely identify a session at the store where terminal device 230 is located. In other words, a session associated with a terminal device 230 at a different store may have a same session ID (but be associated with a different location ID).

Server device 220 may obtain the session ID by generating the session ID. For example, server device 220 may generate a random string of characters as the session ID. Additionally, or alternatively, terminal device 230 may generate the session ID and transmit the session ID to server device 230. In this case, server device 220 may obtain the session ID by receiving the session ID from terminal device 230 with the request to start the session. For example, the store representative may input an employee identifier identifying the representative (e.g., an employee name and/or an employee number) into terminal device 230 as the session ID.

The location ID may identify a location associated with terminal device 230. For example, the location ID may represent a store where terminal device 230 is located. Each store may be associated with a location ID and each store may include multiple terminal devices 230. The location ID may be a string of characters of any length. For example, the location ID may include numbers, letter, symbols, and/or other characters. In some implementations, the location ID may have a length that may be easily input by a user and still uniquely identify a store. For example, the location ID may have a length of five or fewer characters.

Server device 220 may obtain the location ID from a terminal device data structure included in a memory of server device 220 and/or of another device based on the terminal device information included in the request. For example, the terminal device data structure may associate a location ID with terminal device 230. Additionally, or alternatively, terminal device 230 may store the location ID and transmit the location ID to server device 220. In this case, server device 220 may receive the location ID from terminal device 230 with the request to start the session.

In some implementations, the session may be associated with account ID information identifying the account the person at the store desires to discuss. For example, if the request to start the session includes the account ID information, the account ID information may be associated with the session.

As shown in FIG. 5, process 500 may include transmitting the session ID and/or the location ID to terminal device 230 (block 530). For example, server device 220 may transmit the session ID and/or the location ID to terminal device 230.

In some implementations, server device 220 may have generated the session ID. Accordingly, server device 220 may transmit the session ID to terminal device 230. Additionally, or alternatively, the terminal device 230 may have generated the session ID and transmitted the session ID to server device 220. Accordingly, server device 220 may not have to transmit the session ID to terminal device 230 because terminal device 230 already has the session ID.

Terminal device 230 may display the session ID and the store representative may read the session ID. The store representative may provide the session ID to the person desiring to access the account (e.g., the store representative may verbally provide the session ID to the person and/or allow the person to read the session ID displayed on terminal device 230).

In some implementations, server device 220 may have obtained the location ID from the terminal device data structure. Accordingly, server device 220 may transmit the location ID to terminal device 230. Additionally, or alternatively, the terminal device 230 may store the location ID and may have transmitted the location ID to server device 220. Accordingly, server device 220 may not have to transmit the location ID to terminal device 230 because terminal device 230 already has the location ID.

Terminal device 230 may display the location ID and the store representative may read the location ID. The store representative may provide the location ID to the person desiring to access the account (e.g., the store representative may verbally provide the location ID to the person and/or allow the person to read the location ID displayed on terminal device 230).

As shown in FIG. 5, process 500 may include receiving the session ID, location information, and authentication information from user device 210 operated by the person (block 540). For example, server device 220 may receive the session ID, the location information, and/or the authentication information from user device 210.

The person at the store may execute an application on user device 210 that communicates with server device 220. The application may be a store application installed and executed on user device 210 for authentication in a store. The person may input the session ID received from the store representative into user device 210 using the application. Accordingly, user device 210 may obtain the session ID via user input.

In some implementations, the person may input the location information into user device 210 by inputting the location ID received from the store representative into user device 210 using the application. Accordingly, user device 210 may receive the location information via user input. Additionally, or alternatively, the location information may be a GPS location obtained from a GPS sensor included in user device 210.

User device 210 may obtain the authentication information by the person at the store inputting the authentication information into the application. Additionally, or alternatively, the application may already store the authentication information and provide the authentication information to user device 210. The authentication information may be a string of characters of any length. For example, the authentication information may be a password associated with the account.

In some implementations, server device 220 may receive account ID information identifying the account from user device 210. User device 210 may obtain the account ID information by the person at the store inputting the account ID information into the application. Additionally, or alternatively, the application may store the account ID information and provide the account ID information to user device 210.

User device 210 may transmit the obtained session ID, location information, authentication information, and/or account ID information to server device 220 using the application. Server device 220 may receive the session ID, the location information, the authentication information, and/or the account ID information from user device 210.

As shown in FIG. 5, process 500 may include identifying the session based on the session ID and the location information (block 550). For example, server device 220 may identify the session.

Server device 220 may identify the location ID based on the location information. For example, the location information may include the location ID. Additionally, or alternatively, the location information may indicate a GPS location. Server device 220 may use the GPS location to determine a store at the location and a location ID associated with the store.

Thus, server device 220 may determine a session associated with the session ID and/or the location ID and identify terminal device 230 associated with the session. In some implementations, the location ID may not be needed to identify the session. For example, the session ID may uniquely identify the session from among sessions for all terminal devices 230 at all stores. Additionally, or alternatively, the session ID may uniquely identify the session from among sessions for terminal devices 230 at a same store. In such a case, the location ID may be used to identify the store and the session ID may be used to identify a specific session associated with a terminal device 230 at the store.

As shown in FIG. 5, process 500 may include generating an authentication message based on the authentication information (block 560). For example, server device 220 may generate the authentication message.

The authentication message may include the authentication information. For example, the authentication message may include the password input by the person at the store.

Additionally, or alternatively, server device 220 may use the authentication information to authenticate the user. For example, server device 220 may have received account ID information from user device 210 and/or terminal device 230. Server device 220 may access the account in the account data structure using the account ID information (e.g., an account ID, contact information associated with account, etc.) and determine whether the authentication information received from user device 210 (e.g., a password) matches the account authentication information. Server device 220 may generate an authentication result indicating whether the user of user device 210 is an authorized user of the account. Accordingly, the authentication message may include the authentication result (e.g., "authentication successful" or "authentication failed").

Server device 220 may determine whether the session between the server device 220 and terminal device 230 is still active or has been terminated. For example, server device 220 may determine whether the interactive information interchange between server device 220 and terminal device 230 has been terminated. Additionally, or alternatively, server device 220 may determine whether the entry for the session in the data structure has been deleted. If the session is still active, server device 220 may generate the authentication message. If the session has been terminated, server device 220 may stop process 500 and not generate the authentication message.

As shown in FIG. 5, process 500 may include transmitting the authentication message to terminal device 230 (block 570). For example, server device 220 may transmit the authentication message to terminal device 230.

Terminal device 230 may receive the authentication message form server device 220 and display the authentication message. In some implementations, the authentication message may include the authentication information. In some implementations, the displayed authentication information may be masked to prevent the store representative and/or others from seeing the authentication information. The store representative may determine if the person at the store is authorized to access the account by checking whether the displayed authentication information (e.g., a password) matches the account authentication information for the account the person is trying to access. Additionally, or alternatively, the authentication message may include the authentication result generated by server device 220. Accordingly, the store representative may determine whether the person at the store is authorized to access the account by reading the authentication result displayed by terminal device 230.

As shown in FIG. 5, process 500 may include terminating the session (block 580). For example, server device 220 may terminate the session.

Server device 220 may terminate the session by terminating the interactive information interchange between server device 220 and terminal device 230 associated with the session ID. Additionally, or alternatively, server device 220 may terminate the session by deleting an entry for the session in a data structure.

In some implementations, server device 220 may terminate the session based on receiving a termination message from terminal device 230 instructing server device 220 to terminate the session. Additionally, or alternatively, server device 220 may terminate the session based on a same terminal device 230 sending a request for a new session.

In some implementations, server device 220 may terminate the session based on a message from user device 210. For example, the application on user device 210 may transmit a GPS location to server device 220 during the session. If the GPS location indicates user device 210 has left the store where terminal device 230 is located, server device 220 may terminate the session.

The session ID associated with the session may be reused for a new session once the session has been terminated.

While a series of blocks has been described with regard to FIG. 5, the blocks and/or the order of the blocks may be modified in some implementations. Additionally, or alternatively, non-dependent blocks may be performed in parallel.

FIG. 6 is a diagram of an example implementation 600 relating to process 500 shown in FIG. 5. Assume a person brings user device 610 into a store and desires to discuss an account with a store representative. The store representative may obtain an account ID from the person. The store representative may use terminal device 630 to transmit a request to a server device to start a session to authenticate that the person is authorized to discuss the account.

The server device may receive the request and create a session. The session may be associated with terminal device 630. Additionally, the server device may generate a session code (e.g., a session ID) for the session (e.g., "8173"). The session code may be different than any other session code that is currently being used for another terminal device 630 at the store, but may be the same as a session ID associated with a terminal device 630 at another store. The server device may associate a store code (e.g., a location ID) for the store where terminal device 630 is located with the session. The server device may transmit the session ID to terminal device 630. The server device may also transmit the store code to terminal device 630 (e.g., "7482").

Terminal device 630 may receive the session code and the store code and display the session code and the store code. The store representative may convey the session code and the store code to the person at the store.

The person may input the store code and the session code into user device 610. The person may also input a password (e.g., "6172"), for the account, into user device 610. User device 610 may transmit the store code, the session code, and the password to the server device. The server device may identify the session associated with terminal device 630 based on the store code and the session code. The server device may transmit the password to terminal device 630 and terminal device 630 may use the password to authenticate the person at the store.

FIG. 7 is a flowchart of an example process 700 for transmitting an authentication message from user device 210 to terminal device 230. In some implementations, one or more process blocks of FIG. 7 may be performed by server device 220. Additionally, or alternatively, one or more process blocks of FIG. 7 may be performed by another device or a group of devices separate from or including server device 220.

As shown in FIG. 7, process 700 may include receiving a request from terminal device 230 to start a session to authenticate a user (block 710). For example, server device 220 may receive the request from terminal device 230 to start a session.

The store representative may have to verify that the person is authorized to access the account before discussing the account with the person. Accordingly, the store representative may use terminal device 230 at the store to transmit a request to server device 220 to start a session to verify that the person at the store is authorized to access the account. The request may include a terminal device ID identifying terminal device 230 and/or the store representative that sent the request. Server device 220 may receive the request transmitted by terminal device 230.

As shown in FIG. 7, process 700 may include creating a session for terminal device 230 associated with the terminal device ID (block 720). For example, server device 220 may create the session.

Server device 220 may create the session by establishing an interactive information interchange between server device 220 and terminal device 230. Additionally, or alternatively, the session may be an entry in a data structure identifying terminal device 230. The session may be associated with the terminal device ID.

As shown in FIG. 7, process 700 may further include providing store information to user device 210 (block 730). For example, server device 220 may provide the store information to user device 210.

The person at the store may execute an application on user device 210. The application on user device 210 may prompt the person at the store to select the store from a list of stores. Additionally, or alternatively, the application may select a store based on a GPS location of user device 210. The application may send information identifying the selected store to server device 220. Server device 220 may receive the information identifying the selected store. Server device 220 may store a data structure including store information about multiple stores. The store information may include terminal device information about terminal devices 230 at each store and store representatives at each store. Server device 220 may obtain the store information about the selected store from the data structure and provide the store information about the selected store to user device 210. In some implementations, the store information may indicate which terminal device 230 and/or store representatives have an active session with server device 220. Additionally, or alternatively, server device 220 may only provide information about terminal devices 230 and/or store representatives that have an active session with server device 220. Furthermore, the store information transmitted to user device 210 may include a terminal device ID for each terminal device 230 and/or store representative in the selected store.

As shown in FIG. 7, process 700 may further include receiving terminal device information, included in the store information, and authentication information for user device 210 (block 740). For example, server device 220 may receive the terminal device information and the authentication information from user device 210.

User device 210 may receive the store information and display the store information to the person at the store. For example, user device 210 may display a list of store representatives that work at the store and/or a list of terminal devices 230 in the store. The user may select a store representative from the list and/or a terminal device 230 from the list. Additionally, or alternatively, user device 210 may display a virtual representation of the store indicating the location of terminal devices 230 in the store. Accordingly, the person may select terminal device 230 based on a location of the terminal device 230 in the store as shown in the virtual representation. User device 210 may generate and provide terminal device information about the selected terminal device 230 and/or store representative to server device 220 and server device 220 may receive the terminal device information. The terminal device information may include a terminal device ID for the selected terminal device 230 and/or store representative.

The application on user device 210 may prompt the person to input authentication information. Accordingly, user device 210 may obtain the authentication information by the person at the store inputting the authentication information into the application. Additionally, or alternatively, the application may store the authentication information and provide the authentication information to user device 210. The authentication information may be a string of characters of any length. For example, the authentication information may be a password associated with the account. User device 210 may transmit the authentication information to server device 220. Server device 220 may receive the authentication information from user device 210.

As shown in FIG. 7, process 700 may further include identifying the session based on the terminal device information (block 750). For example, server device 220 may identify the session.

Server device 220 may identify the session based on the terminal device information. For example, the terminal device information may include the terminal device ID associated with the session. Additionally, or alternatively, server device 220 may use the terminal device information to look up a terminal device ID in the data structure.

Thus, server device 220 may determine a session associated with the terminal device ID and identify terminal device 230 associated with the session.

As shown in FIG. 7, process 700 may include generating an authentication message based on the authentication information (block 760). For example, server device 220 may generate the authentication message.

The authentication message may include the authentication information. For example, the authentication message may include the password input by the person at the store. In some implementations, server device 220 may encrypt the authentication information.

Additionally, or alternatively, server device 220 may use the authentication information to authenticate the user. For example, server device 220 may have received account ID information from user device 210 and/or terminal device 230. Server device 220 may access the account in the account data structure using the account ID information (e.g., an account ID, contact information associated with account, etc.) and determine whether the authentication information received from user device 210 (e.g., a password) matches the account authentication information for the account. Server device 220 may generate an authentication result indicating whether the user of user device 210 is an authorized user of the account. Accordingly, the authentication message may include the authentication result (e.g., "authentication successful" or "authentication failed").

Server device 220 may determine whether the session between the server device 220 and terminal device 230 is still active or has been terminated. For example, server device 220 may determine whether the interactive information interchange between server device 220 and terminal device 230 has been terminated. Additionally, or alternatively, server device 220 may determine whether the entry for the session in the data structure has been deleted. If the session is still active, server device 220 may generate the authentication message. If the session has been terminated, server device 220 may stop process 500 and not generate the authentication message.

As shown in FIG. 7, process 700 may include transmitting the authentication message to terminal device 230 (block 770). For example, server device 220 may transmit the authentication message to terminal device 230.

Terminal device 230 may receive the authentication message from server device 220 and display the authentication message. In some implementations, the authentication message may include the authentication information. The store representative, via terminal device 230, may determine if the person at the store is authorized to access the account by checking whether the displayed authentication information (e.g., password) matches account authentication information for the account the person is trying to access. Additionally, or alternatively, the authentication message may include the authentication result generated by server device 220. Accordingly, the store representative may determine whether the person at the store is authorized to access the account by reading the authentication result displayed by terminal device 230.

As shown in FIG. 7, process 700 may include terminating the session (block 780). For example, server device 220 may terminate the session.

Server device 220 may terminate the session by terminating the interactive information interchange between server device 220 and terminal device 230 associated with the terminal device ID. Additionally, or alternatively, server device 220 may terminate the session by deleting an entry for the session in a data structure.

In some implementations, server device 220 may terminate the session based on receiving a termination message from terminal device 230 instructing server device 220 to terminate the session. Additionally, or alternatively, server device 220 may terminate the session based on the same terminal device 230 sending a request for a new session.

In some implementations, server device 220 may terminate the session based on a message from user device 210. For example, the application on user device 210 may transmit a GPS location to server device 220 during the session.

If the GPS location indicates user device 210 has left the store including terminal device 230, server device 220 may terminate the session.

While a series of blocks has been described with regard to FIG. 7, the blocks and/or the order of the blocks may be modified in some implementations. Additionally, or alternatively, non-dependent blocks may be performed in parallel.

FIG. 8 is a diagram of an example implementation 800 relating to process 700 shown in FIG. 7. Assume a person brings user device 810 into a store and desires to discuss an account with a store representative. The store representative may obtain an account ID (e.g., a phone number associated with the account) from the person. The store representative may use terminal device 830 to transmit a request to a server device to start a session to authenticate that the person is authorized to discuss the account. The request may include the account ID and information identifying the store representative.

The server device may receive the request from the terminal device and start a session. The session may be associated with terminal device 830 that sent the request, the information identifying the store representative, and the account ID.

The store representative may instruct the person at the store to use user device 810 to execute an application used for authentication. The person may execute the application on user device 810. The application may detect a location of user device 810 using a GPS device on user device 810. The application may determine that a store in Chicago is associated with the location. The application may cause user device 810 to display information about the Chicago store. For example, the application may cause user device 810 to display a list of names for store representatives that work at the store in Chicago. The person may input a selection of a name (e.g., Emily Johnson). The application may store authentication information in a memory of user device 810 and/or prompt the person to input the authentication information. The application may obtain the authentication from the memory or from a user input. User device 810 may transmit the information identifying the selected store representative and the authentication information to the server device.

The server device may receive the information identifying the selected store representative and the authentication information. The server device may determine a session based on the selected store representative. For example, a store representative may only be associated with one active session at a time. The server device may obtain the account ID associated with the session and obtain account authentication information for the account. The server device may compare the authentication information received from user device 810 with the account authentication information to generate an authentication result. For example, the authentication result may indicate that authentication is successful because the authentication information received form user device 810 matches the account authentication information. The server device may generate an authentication message including the authentication result and transmit the authentication message to terminal device 830.

Terminal device 830 may receive the authentication message from the server device. Terminal device 830 may display a message "authentication successful" indicating that the person at the store is authorized to access the account.

Implementations described herein may improve privacy and/or security by allowing a person at a store to verify the person is an authorized user of an account using a person's mobile device to transmit authentication information to authenticate the person in a manner that may not be overheard or seen by other people at the store.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      receive a request from a terminal device to start a session to authenticate a person, the person being associated with an account;
create the session,
   the session being associated with the terminal device;
generate, based on creating the session, a session identifier;
associate the session identifier with the session,
   the session identifier uniquely identifying the session;
associate a store code with the session;
transmit the session identifier and the store code to the terminal device,
   transmitting the session identifier and the store code to the terminal device causing the session identifier and the store code to be provided for display on the terminal device;
receive session information and authentication information from a user device operated by the person,
   the session information including the session identifier and the store code, and
   the session identifier and the store code being received as input to the user device;
determine the session based on the session information;
generate an authentication message based on the authentication information; and
transmit the authentication message to the terminal device associated with the session to authenticate that the person is associated with the account.

2. The device of claim 1, where the one or more processors are further to:
associate a location identifier with the session,
   the location identifier identifying a location of the terminal device,
   the session information received from the user device including the location identifier; and
where the one or more processors, when determining the session, are to:
   determine the session based on the location identifier included in the session information.

3. The device of claim 1, where the one or more processors are further to:
associate a location identifier with the session,
   the location identifier identifying a business where the terminal device is located, and
   the session information received from the user device including location information,
      the location information indicating a location of the user device, and
      the location identifier being determined based on the location information; and
where the one or more processors, when determining the session, are to:
   determine the session based on the location identifier.

4. The device of claim 1, where the one or more processors are further to:
associate a location identifier with the session,
   the location identifier identifying a location at which a plurality of terminal devices are located,
      the plurality of terminal devices including the terminal device; and
where the one or more processors, when determining the session, are to:
   determine the session based on the location identifier.

5. The device of claim 4, where each of the session identifier and the location identifier are fewer than five characters.

6. The device of claim 1, where the one or more processors are further to:
terminate the session based on at least one of:
   receiving a first request from the terminal device requesting that the session be terminated, or
   receiving a second request from the terminal device requesting that a new session be started.

7. A non-transitory computer-readable medium storing instructions, the instructions comprising:
a plurality of instructions that, when executed by a processor of a device, cause the processor to:
   receive a request from a terminal device to establish a session for receiving an authentication message;
   establish the session,
      the session being associated with the terminal device;
   generate, based on establishing the session, a session identifier;
   associate the session identifier with the session,
      the session identifier uniquely identifying the session;
   associate store information with the session;
   transmit the session identifier and the store information to the terminal device,
      transmitting the session identifier and the store information to the terminal device causing the session identifier and the store information to be provided for display on the terminal device;
   receive session information and authentication information from a user device operated by a person,
      the session information including the session identifier and the store information, and
      the session identifier and the store information being received as input to the user device;
   determine the session associated with the terminal device based on the session information;
   generate the authentication message based on the authentication information; and
   provide the authentication message to the terminal device associated with the session to authenticate the person.

8. The non-transitory computer-readable medium of claim 7, where the store information indicates information about at least one of a plurality of terminal devices at the store or a plurality of store representatives,
the plurality of terminal devices including the terminal device.

9. The non-transitory computer-readable medium of claim 7, where the store information causes the user device to display a virtual representation of the store that permits the person to select the terminal device.

10. The non-transitory computer-readable medium of claim 7, where the plurality of instructions further cause the processor to:
transmit a request to the user device to select a business;
receive a response indicating a selected business;
provide business information to the user device about the selected business; and
where the plurality of instructions, that cause the processor to receive the session information, cause the processor to:
   receive the session information from the user device based on providing the business information to the user device about the selected business,
      the session information including information included in the business information.

11. The non-transitory computer-readable medium of claim 7, where the plurality of instructions further cause the processor to:
receive location information from the user device indicating a location of the user device;
determine a business associated with the location;
provide business information for the business to the user device; and
where the plurality of instructions, that cause the processor to receive the session information, cause the processor to:
receive the session information from the user device after providing the business information for the business to the user device,
the session information including information included in the business information.

12. The non-transitory computer-readable medium of claim 7, where the plurality of instructions further cause the processor to:
associate a terminal device identifier with the session,
the terminal device identifier identifying at least one of the terminal device or a business representative operating the terminal device, and
the session information received from the user device identifying at least one of the terminal device or the business representative;
determine the terminal device identifier based on the session information; and
where the processor, when determining the session, is to:
determine the session based on the terminal device identifier.

13. The non-transitory computer-readable medium of claim 7, where the plurality of instructions further cause the processor to:
terminate the session based on at least one of:
receiving a first request from the terminal device requesting that the session be terminated, or
receiving a second request from the terminal device requesting that a new session be started.

14. A method comprising:
receiving, by a device, a request from a terminal device to start a session to authenticate an account;
creating, by the device, the session,
the session being associated with the terminal device;
generating, by the device and based on creating the session, a session identifier;
associating, by the device, the session identifier with the session,
the session identifier uniquely identifying the session;
associating, by the device, a store code with the session;
transmitting, by the device, the session identifier and the store code to the terminal device,
transmitting the session identifier and the store code to the terminal device causing the session identifier and the store code to be provided for display on the terminal device;
receiving, by the device, session information and authentication information from a user device,
the session information including the session identifier and the store code, and
the session identifier and the store code being received as input to the user device;
determining, by the device, the session associated with the terminal device based on the session information received from the user device;
creating, by the device, an authentication message based on the authentication information; and
providing, by the device, the authentication message to the terminal device associated with the session to authenticate the account.

15. The method of claim 14, further comprising:
terminating the session based on at least one of:
receiving a first request from the terminal device requesting that the session be terminated, or
receiving a second request from the terminal device requesting that a new session be started.

16. The method of claim 14, further comprising:
terminating the session based on at least one of:
receiving a request from the user device requesting that the session be terminated or
receiving location information from the user device indicating that the user device is outside of a location where the terminal device is located.

17. The method of claim 14, further comprising:
determining the session is active; and
where providing the authentication message to the terminal device comprises:
providing the authentication message to the terminal device based on the session being active.

18. The method of claim 14, where the authentication message includes the authentication information.

19. The method of claim 14, further comprising:
receiving account information identifying the account from at least one of the terminal device or the user device.

20. The method of claim 19, further comprising:
determining an authentication result indicating whether the authentication information received from the user device matches account authentication information for the account,
the authentication message including the authentication result.

* * * * *